United States Patent
Rivera et al.

(10) Patent No.: US 12,001,299 B2
(45) Date of Patent: Jun. 4, 2024

(54) DATA BACKUP ON SECURE PARTITION

(71) Applicant: Lenovo (United States) Inc., Morrisville, NC (US)

(72) Inventors: David Rivera, Raleigh, NC (US); Joshua N Novak, Wake Forest, NC (US); Matthew David Hosford, Wake Forest, NC (US)

(73) Assignee: LENOVO (SINGAPORE) PTE. LTD., Singapore (SG)

(*) Notice: Subject to any disclaimer, the term of this patent is extended or adjusted under 35 U.S.C. 154(b) by 0 days.

(21) Appl. No.: 17/490,489

(22) Filed: Sep. 30, 2021

(65) Prior Publication Data
US 2023/0115901 A1   Apr. 13, 2023

(51) Int. Cl.
G06F 11/14 (2006.01)
(52) U.S. Cl.
CPC ...... *G06F 11/1469* (2013.01); *G06F 2201/84* (2013.01)
(58) Field of Classification Search
CPC . G06F 11/1469; G06F 11/1458; G06F 16/278
See application file for complete search history.

(56) References Cited

U.S. PATENT DOCUMENTS

| | | | |
|---|---|---|---|
| 2010/0241837 A1* | 9/2010 | Concorso | G06F 9/441 711/173 |
| 2017/0083709 A1* | 3/2017 | Simmons | G06F 21/6218 |
| 2017/0111388 A1* | 4/2017 | Mehta | G06F 21/56 |
| 2018/0314600 A1* | 11/2018 | Mori | G06F 11/1666 |
| 2021/0117272 A1* | 4/2021 | Kleppinger | G06F 11/1461 |

* cited by examiner

*Primary Examiner* — Apu M Mofiz
*Assistant Examiner* — Cindy Nguyen
(74) *Attorney, Agent, or Firm* — FERENCE & ASSOCIATES LLC

(57) ABSTRACT

One embodiment provides a method, including: receiving, at an information handling device, an indication to backup data resident on an operating system (OS) partition of the information handling device; initiating, responsive to receiving the indication, a reboot of the OS into a pre-OS environment; accessing, in the pre-OS environment, a backup partition that is distinct and separate from the OS partition; and performing, subsequent to the accessing, a backup of the data from the OS partition to the backup partition. Other aspects are described and claimed.

20 Claims, 3 Drawing Sheets

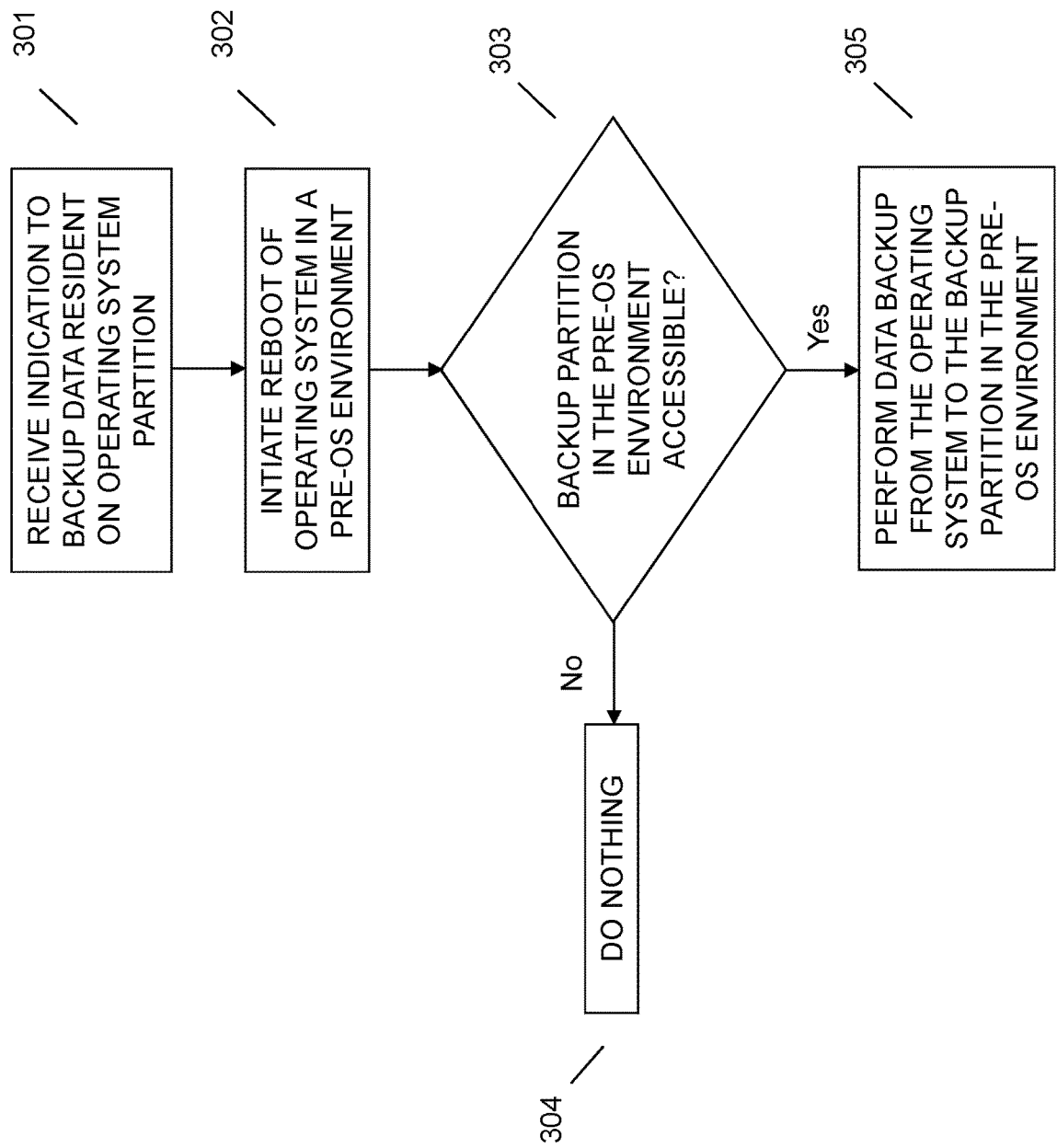

DATA BACKUP ON SECURE PARTITION

BACKGROUND

Individuals utilize their information handling devices ("devices"), for example, laptop and/or personal computers, smart phones, tablet devices, hybrid devices, and the like, to accomplish a variety of different tasks throughout the day. For example, users may use their devices to produce work product, communicate with others (e.g., via email, social media messenger, etc.), surf the web, etc. These device interactions produce various types of data, some or all of which may be saved on the computer system. Situations arise where malicious software may infect a user's device, thereby corrupting certain pieces of data and/or making it inaccessible to the user.

BRIEF SUMMARY

In summary, one aspect provides a method, including: receiving, at an information handling device, an indication to backup data resident on an operating system (OS) partition of the information handling device; initiating, responsive to receiving the indication, a reboot of the OS into a pre-OS environment; accessing, in the pre-OS environment, a backup partition that is distinct and separate from the OS partition; and performing, subsequent to the accessing, a backup of the data from the OS partition to the backup partition.

Another aspect provides an information handling device, including: a processor; a memory device that stores instructions executable by the processor to: receive an indication to backup data resident on an operating system (OS) partition of the information handling device; initiate, responsive to receiving the indication, a reboot of the OS into a pre-OS environment; access, in the pre-OS environment, a backup partition that is distinct and separate from the OS partition; and perform, subsequent to the accessing, a backup of the data from the OS partition to the backup partition.

A further aspect provides a product, including: a storage device that stores code, the code being executable by a processor and comprising: code that receives an indication to backup data resident on an operating system (OS) partition of the information handling device; code that initiates, responsive to receiving the indication, a reboot of the OS into a pre-OS environment; code that accesses, in the pre-OS environment, a backup partition that is distinct and separate from the OS partition; and code that performs, subsequent to the accessing, a backup of the data from the OS partition to the backup partition.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example method of securely backup up data.

DETAILED DESCRIPTION

Figure 1:
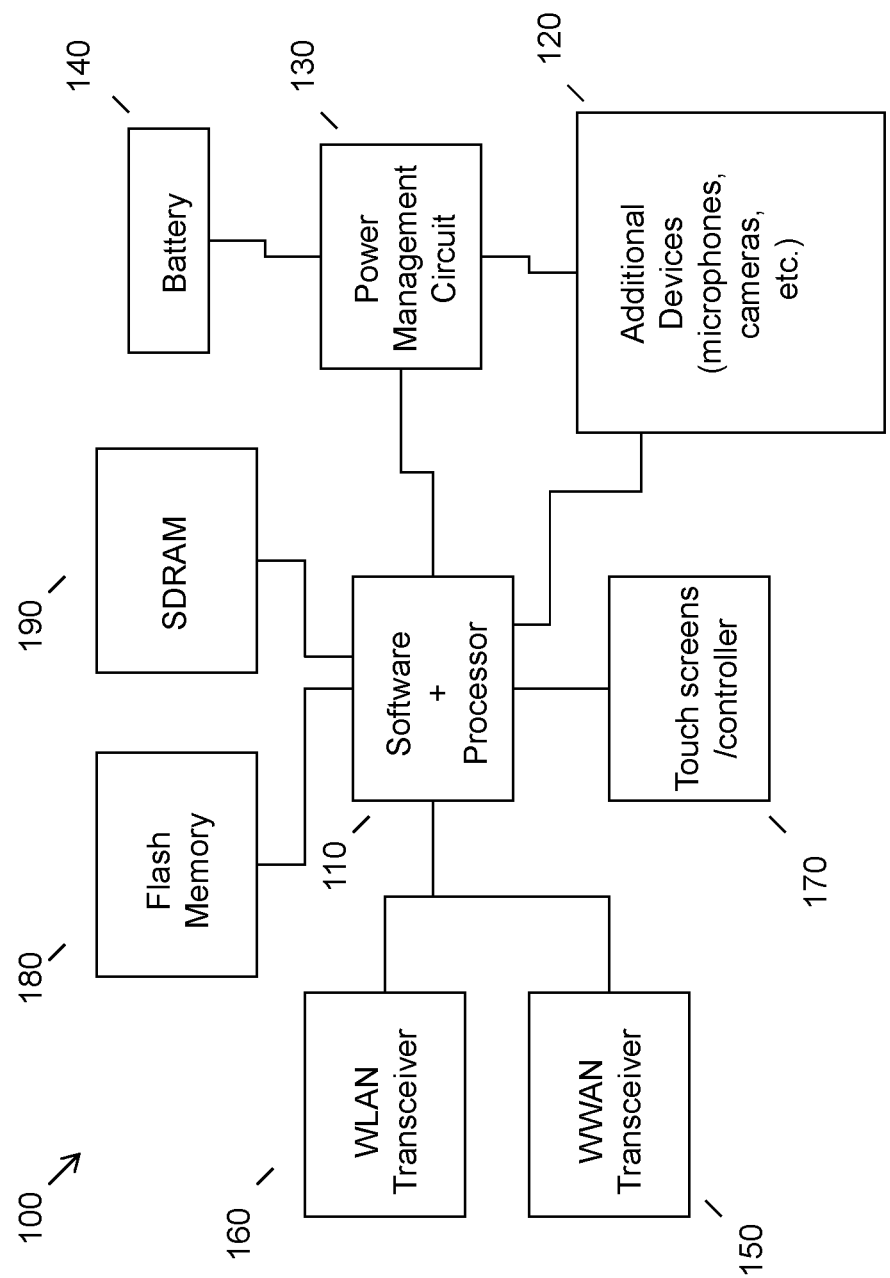
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

One type of data-affecting malware that has become a prevalent issue in recent years is ransomware. Ransomware is a type of malicious software that infects a user's device and restricts a users' access to the device as a whole, or at least some contents on the device, until a ransom is paid. Ransomware is often spread through phishing emails that contain malicious attachments, through drive-by downloading (i.e., when a user unknowingly visits an infected website, resulting in the malware being downloaded and installed without the user's knowledge), or through social media (e.g., via web-based messaging applications, etc.).

With the spread of ransomware on the rise, an increasing number of individuals are finding it very difficult to recover from such an attack. Existing recovery solutions, aside from actually paying the requested ransom, involve utilizing secure backups that may contain copies of the data resident on the operating system (OS). Data backed up at a greater frequency may improve users' odds of avoiding impacts and delays to their daily workflow and device use. A major issue with many backup processes, however, is that most ransomware will look to spread beyond the initial attack point and attack the backups as well. Furthermore, some ransomware also deletes the Windows-created automatic Volume Shadow Copy files, so the OS-based backup copies are also destroyed. Additionally, various peripheral devices, such as USBs, can also be destroyed as they are connected to the OS and thus susceptible to the spread of ransomware.

Accordingly, an embodiment provides a secure backup method that cannot be affected by ransomware and that also makes it easy and convenient for users to recover their data in the event of corruption. In an embodiment, an indication to backup data contained on an operating system (OS) partition may be received at a device. Responsive to receiving this indication, an embodiment may initiate a reboot of the OS into a pre-OS environment and access a backup partition that is distinct and separate from the OS partition. An embodiment may thereafter perform a backup of the data from the OS partition to the backup partition while in this pre-OS environment. Because the main OS is not running in the pre-OS environment, there is no chance for the ransomware to affect any of the files in the backup partition, thereby resulting in a more secure method of data backup.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
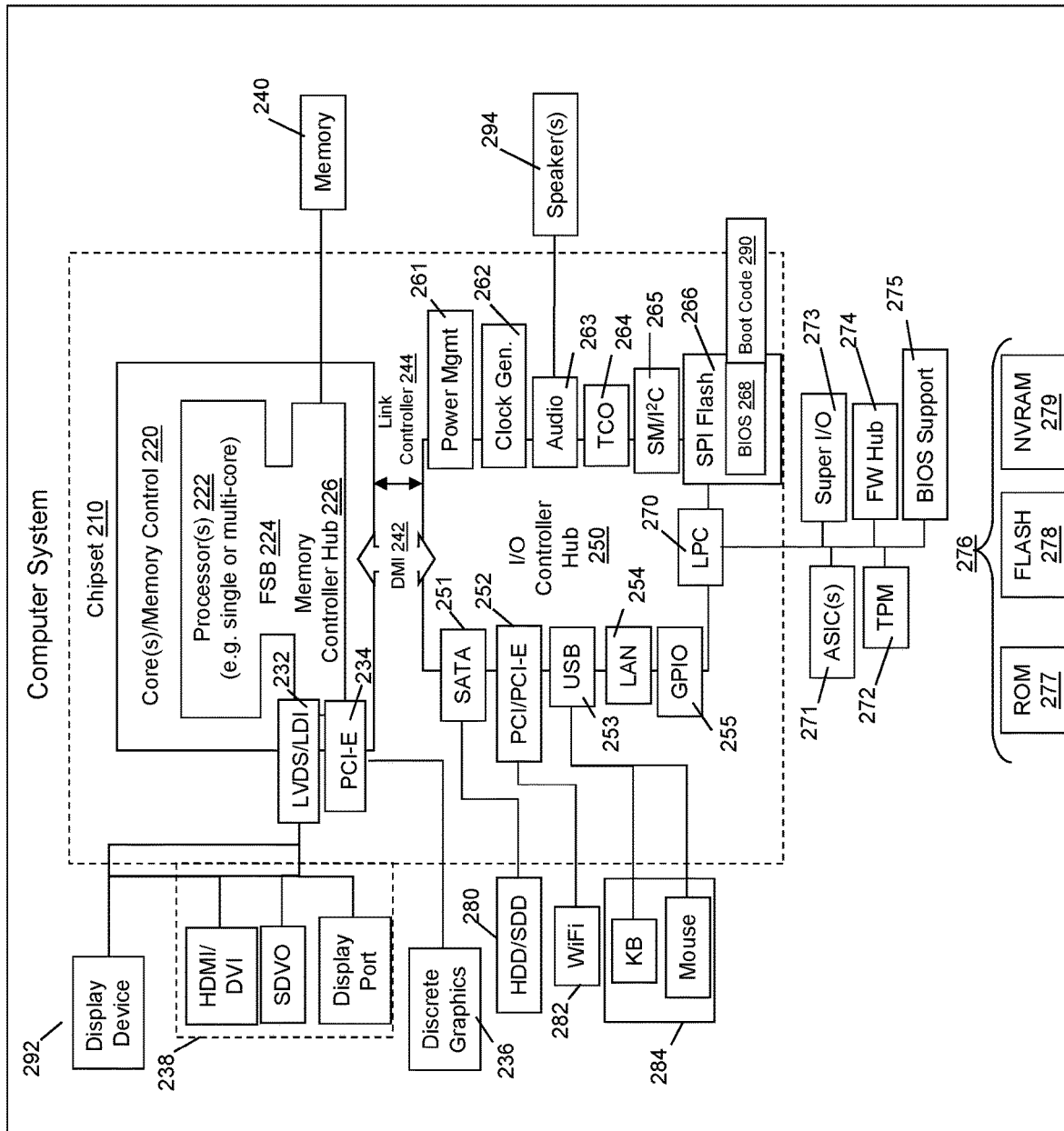
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, NC, or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in computing devices capable of obtaining and storing data. For example, the circuitry outlined in FIG. 1 may be implemented in a smart phone or tablet embodiment, whereas the circuitry outlined in FIG. 2 may be implemented in a hybrid computing device.

Referring now to FIG. 3, an embodiment provides a method of securely backing up data to a backup partition in a pre-OS environment. At 301, an embodiment may receive an indication to back up data resident on an operating system (OS) partition of a device. In an embodiment, the OS partition may contain the hardware-specific files that are needed to load the base OS as well as any data saved to the device while the user is operating the OS. In the context of this application, the data that may be backed up may be virtually any type of data (e.g., folders, files, documents, images, videos, communications, etc.).

In an embodiment, the backup process can be set to run in an automated fashion (i.e., without receipt of any additional user input). More particularly, an embodiment may be programmed to initiate a backup at predetermined times or in response to predetermined events. Regarding the former, the indication to initiate a backup may be received at a predetermined frequency. For example, a system can be set to reboot each night and take a backup of new and/or updated files. Regarding the latter, the indication to initiate a backup may be received responsive to identifying that a user has accessed certain types of content. The relevant content may be content that may contain an inherent threat level above a predetermined threshold. For example, an indication to backup content may be received responsive to identifying that a user has accessed suspicious websites, opened suspicious emails, and/or downloaded suspicious content. Additionally or alternatively to the foregoing, the indication to backup may be received responsive to identifying that a user is working with sensitive and/or important subject matter. In such a situation, an embodiment may recognize that a user may desire to increase the frequency of backups to minimize the chance that their important work is lost or becomes corrupted.

At 302, responsive to receiving the indication, an embodiment may initiate a reboot of the OS into a pre-OS environment. In an embodiment, the pre-OS environment may correspond to any of Windows Presentation Environment (Win-PE), Linux, a Unified Extensible Firmware Interface (UEFI) image embedded in the BIOS firmware, or other environments that may be run on the PC but that are independent of the main OS. In an embodiment, the reboot may be initiated automatically (e.g., at a predetermined frequency or at predetermined intervals as previously discussed, etc.) or may be initiated manually by the user. With respect to the latter, an embodiment may delay the reboot initiation until confirmation is received from the user. For example, before the reboot is initiated an embodiment may broadcast a notification to a user (e.g., a visual notification broadcast on a display screen of the device, an audible notification broadcast via audio output devices associated with the device, a combination thereof, etc.) that informs them that a reboot needs to be performed to backup data. Responsive to receiving user confirmation (e.g., by detecting selection of a "yes", "proceed", or like button, etc.) an embodiment may proceed with the reboot.

At 303, an embodiment may attempt to access a backup partition. In an embodiment, the backup partition could be created as a part of a custom manufacturing process or, alternatively, can be created by a user (e.g., by adjusting one or more system settings, etc.). The backup partition may be separate and distinct from the OS partition and, once such a partition is created it would not be accessible from the OS. To definitively access the backup partition, it would be done from the pre-OS environment.

In an embodiment, the backup partition may be secured in one or more ways and access to it may be protected. More particularly, a user may be required to provide a particular authentication key to obtain access to the backup partition. For example, in a simpler embodiment, the backup partition may simply require that a keystroke be detected in order to confirm that a human user is utilizing the device (i.e., as opposed to some other type of malicious code). As another example, access to the backup partition may be password protected and a user may be required to enter a correct predetermined string of characters to gain access. The password string may correspond to a user-designated password or, alternatively, may be randomly generated. With respect to the latter, as a non-limiting example, a user may be prompted to enter the randomly generated string of alphanumeric characters they see on a screen. Once access to the backup partition is achieved, the pre-boot environment can trigger a backup from the main partition into the backup partition, as further described below.

Responsive to determining, at 303, that a backup partition does not exist or is not accessible, an embodiment may, at 304, take no additional action. More particularly, an embodiment may revert to a conventional default backup protocol. Conversely, responsive to determining, at 303, that a backup partition does exist and/or is accessible, an embodiment may, at 305, perform a data backup protocol of data contained within the OS partition to the backup partition.

In an embodiment, all data that has not been previously backed up (e.g., since the last backup session, etc.) may be backed up as part of the backup process. Alternatively, only select data types may be backed up into the backup partition. More particularly, the frequency with which particular data types are backed up may be adjusted by the user. Specifically, a user may prefer to have certain data types backed up at a greater frequency than others. As a non-limiting example, sensitive work materials may be backed up each time a backup process is performed whereas stored email communications may only be backed up every other time the backup process is performed.

In an embodiment, data backed up to the backup partition may not overwrite existing data contained within the backup partition. Stated differently, the latest backup should not overwrite any of the previous backups in the event that the latest data has been corrupted. In an embodiment, data can be dynamically deleted from the backup partition after it has remained in the backup partition for a predetermined period of time (e.g., six months, one year, etc.). In a situation where the size of the backup partition is not large enough to accommodate the amount of new data being placed into it, a user may manually reconfigure the size of the partition (e.g., by accessing system settings and designating a new size, etc.) to accommodate the data.

In an embodiment, a recovery of the backed up data may be initiated by a user. Similar to the backup process, the recovery may be initiated in the pre-OS environment. More particularly, to facilitate the recovery, a user would boot into the pre-OS environment and, depending upon the security of the backup partition, provide some type of authentication (e.g., a password, etc.) or indication of physical presence (e.g., a keypress, etc.). Once the authentication and/or physical presence indication is acknowledged, the user may be able to recover files from the backup partition into the main partition.

The various embodiments described herein thus represent a technical improvement to conventional methods of backing up data on a device. Using the techniques described herein, an embodiment may receive an indication to backup data resident on an OS partition. Subsequent to the indication receipt, an embodiment may initiate a reboot of the OS in a pre-OS environment. While in this environment, an embodiment may access a backup partition that is partitioned off from an OS partition and thereafter transfer relevant data from the OS partition to the backup partition. Performing such a backup method in the pre-OS environment may ensure that malicious software, specifically malware, cannot affect the backup data in the backup partition.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device and while an operating system (OS) of the information handling device is active, an indication to back up data resident on an operating system partition of the information handling device to a backup partition residing in a pre-OS environment and that is a partition distinct and separate from the OS partition, wherein the data resident on an operating system partition comprises user data created while the user is operating the operating system within the operating system partition and in an OS environment;
   initiating, responsive to receiving the indication, a reboot of the OS into the pre-OS environment;
   accessing, in the pre-OS environment, the backup partition; and
   performing, subsequent to the accessing and within the pre-OS environment, a backup of the data from the OS partition to the backup partition.

2. The method of claim 1, wherein the receiving the indication comprises receiving the indication at a predetermined frequency.

3. The method of claim 1, wherein the receiving the indication comprises:
   identifying that content having a threat level greater than a predetermined threshold was accessed by a user; and
   generating, responsive to the identifying, the indication to backup data.

4. The method of claim 1, wherein the pre-OS environment runs on the information handling device but is independent of the OS partition.

5. The method of claim 1, wherein the accessing the backup partition comprises accessing via utilizing an authentication key unavailable to the OS.

6. The method of claim 1, wherein the performing the backup comprises performing the backup data of a predetermined type at a greater frequency than data of another type.

7. The method of claim 1, wherein the performing the backup comprises adding new data to previously backed up data in the backup partition.

8. The method of claim 1, further comprising initiating, in the pre-OS environment, a recovery of the data from the backup partition to the OS partition.

9. The method of claim 8, wherein the initiating the recovery comprises initiating the recovery responsive to detecting a keypress from a user.

10. The method of claim 1, wherein a size of the backup partition is adjustable based on user setting adjustment.

11. An information handling device, comprising:
    a processor;
    a memory device that stores instructions executable by the processor to:
    receive, while an operating system (OS) of the information handling device is active, an indication to backup data resident on an operating system (OS) partition of the information handling device to a backup partition residing in a pre-OS environment and that is a partition distinct and separate from the OS partition, wherein the data resident on an operating system partition comprises user data created while the user is operating the operating system within the operating system partition and in an OS environment;

initiate, responsive to receiving the indication, a reboot of the OS into the pre-OS environment;

access, in the pre-OS environment, the backup partition; and perform, subsequent to the accessing and within the pre-OS environment, a backup of the data from the OS partition to the backup partition.

12. The information handling device of claim 11, wherein the instructions executable by the processor to receive the indication comprise instructions executable by the processor to receive the indication at a predetermined frequency.

13. The information handling device of claim 11, wherein the instructions executable by the processor to receive the indication comprise instructions executable by the processor to:

identify that content having a threat level greater than a predetermined threshold was accessed by a user; and generate, responsive to the identifying, the indication to backup data.

14. The information handling device of claim 11, wherein the pre-OS environment runs on the information handling device but is independent of the OS partition.

15. The information handling device of claim 11, wherein the instructions executable by the processor to access the backup partition comprise instructions executable by the processor to access via utilizing an authentication key unavailable to the OS.

16. The information handling device of claim 11, wherein the instructions executable by the processor to perform the backup comprise instructions executable by the processor to perform the backup for data of a predetermined type at a greater frequency than data of another type.

17. The information handling device of claim 11, wherein the instructions executable by the processor to perform the backup comprise instructions executable by the processor to add new data to previously backed up data in the backup partition.

18. The information handling device of claim 11, wherein the instructions are further executable by the processor to initiate, in the pre-OS environment, a recovery of the data from the backup partition to the OS partition.

19. The information handling device of claim 18, wherein the instructions executable by the processor to initiate the recovery comprise instructions executable by the processor to initiate the recovery responsive to detecting a keypress from a user.

20. A product, comprising:

a storage device that stores code, the code being executable by a processor and comprising:

code that receives, while an operating system (OS) of an information handling device is active, an indication to backup data resident on an operating system (OS) partition of the information handling device to a backup partition residing in a pre-OS environment and that is a partition distinct and separate from the OS partition, wherein the data resident on an operating system partition comprises user data created while the user is operating the operating system within the operating system partition and in an OS environment;

code that initiates, responsive to receiving the indication, a reboot of the OS into the pre-OS environment;

code that accesses, in the pre-OS environment, the backup partition; and code that performs, subsequent to the accessing and within the pre-OS environment, a backup of the data from the OS partition to the backup partition.

* * * * *